United States Patent [19]

Yanagidate et al.

[11] Patent Number: 5,623,756
[45] Date of Patent: Apr. 29, 1997

[54] METHOD OF MANUFACTURING A SHOCK ABSORBING TYPE STEERING SHAFT

[75] Inventors: Teruomi Yanagidate, Maebashi; Kiyoshi Sadakata, Gunma-ken, both of Japan

[73] Assignee: NSK Ltd., Tokyo, Japan

[21] Appl. No.: 503,413

[22] Filed: Jul. 17, 1995

[30] Foreign Application Priority Data

Sep. 22, 1994 [JP] Japan .................................... 6-228177

[51] Int. Cl.$^6$ .................................................. B23P 19/02
[52] U.S. Cl. ............................... 29/525; 280/777; 285/1
[58] Field of Search ............................ 29/516, 517, 525; 403/274, 282, 285; 285/304, 330, 382.1, 382.2; 280/775, 777

[56] References Cited

U.S. PATENT DOCUMENTS

| | | | |
|---|---|---|---|
| 1,548,990 | 8/1925 | Garman | 29/516 |
| 3,470,761 | 10/1969 | Okamoto et al. | 280/777 |
| 3,561,251 | 2/1971 | Matsumoto | 29/516 |
| 3,824,665 | 7/1974 | Saito . | |
| 4,674,354 | 6/1987 | Brand | 280/777 |
| 4,991,871 | 2/1991 | Sadakata | 280/777 |
| 5,235,734 | 8/1993 | DuRocher et al. | 29/455.1 |

FOREIGN PATENT DOCUMENTS

| | | |
|---|---|---|
| 2250323 | 4/1973 | Germany . |
| 1-58373 | 4/1989 | Japan . |
| 2-286468 | 11/1990 | Japan . |
| 6-8150 | 2/1994 | Japan . |
| 6-238369 | 8/1994 | Japan ....................... 29/516 |
| 2258712 | 2/1993 | United Kingdom . |

Primary Examiner—David P. Bryant
Attorney, Agent, or Firm—Shapiro and Shapiro

[57] ABSTRACT

In a method of manufacturing a shock absorbing type steering shaft, the fore end portion of a tubular outer shaft having a female serration formed on the inner peripheral surface thereof and the fore end portion of an inner shaft having a male serration formed on the outer peripheral surface thereof are brought into engagement with each other, and then the fore end portions of the two shafts are plastically deformed in the diametral direction thereof. Thereafter, the outer shaft and the inner shaft are displaced relative to each other toward each other in the axial direction thereof. The fore end portion of the small-diametered portion of the outer shaft is then pressure-fitted into the base end portion of the large-diametered portion of the inner shaft. At the same time, the fore end portion of the large-diametered portion is pressure-fitted into the base end portion of the small-diametered portion. Also, the intermediate portion of the small-diametered portion and the intermediate portion of the large-diametered portion are brought into loose engagement with each other.

2 Claims, 10 Drawing Sheets

METHOD OF MANUFACTURING A SHOCK ABSORBING TYPE STEERING SHAFT

BACKGROUND OF THE INVENTION

1. Field of the Invention

This invention relates to a method of manufacturing a shock absorbing type steering shaft incorporated in the steering apparatus of an automobile and utilized to transmit the movement of a steering wheel to a steering gear.

2. Related Background Art

In a steering apparatus for an automobile, a mechanism as shown in FIG. 9 of the accompanying drawings is used to transmit the movement of a steering wheel to a steering gear. In FIG. 9, the reference numeral 1 designates a first steering shaft having a steering wheel 2 fixed to the upper end portion thereof, and the reference numeral 3 denotes a steering column. This steering column 3 is fixed to the lower surface of an instrument panel 6 by upper and lower brackets 4 and 5. The first steering shaft 1 is rotatably inserted in the steering column 3.

The upper end portion of a second steering shaft 8 is connected through a first universal joint 7 to the lower end portion of the first steering shaft 1 which protrudes from the lower end opening of the steering column 3. Further, the lower end portion of the second steering shaft 8 is connected through a second universal Joint 9 to a third steering shaft 10 leading to a steering gear (not shown).

With such a construction, the movement of the steering wheel 2 is transmitted to the steering gear through the first steering shaft 1 inserted in the steering column 3, the first universal joint 7, the second steering shaft 8, the second universal joint 9 and a third steering shaft 10 to give a steering angle to wheels.

In the steering mechanism thus constructed, the steering column 3 and the steering shafts 1, 8, 10 are usually made into a shock absorbing type in which the full length shortens due to a shock in order to protect a driver during collision. As such a shock absorbing type steering shaft, a structure in which an outer shaft and an inner shaft serration-engaged with each other are coupled together by synthetic resin is described, for example, in Japanese Patent Application Laid-Open No. 2-286468. Also, in Japanese Utility Model Application Laid-Open No. 1-58373, there is described a structure in which male serration grooves are formed at two locations on the outer peripheral surface of an inner shaft and a female serration groove is formed on the inner peripheral surface of an outer shaft and these male and female grooves are pressure-fitted to each other.

However, in the case of the structure described in the above-mentioned Japanese Patent Application Laid-Open No. 2-286468, the coupling of the outer shaft and the inner shaft is done by only synthetic resin and therefore, it is conceivable that sufficient torsional durability is not obtained due to a deficiency in heat resistance under certain conditions, such as when it is installed within an engine compartment and liable to become hot. Also, in the case of the structure described in the above-mentioned Japanese Utility Model Application Laid-Open No. 1-58373, the work of making the phases of the male and female serration grooves coincident with each other to pressure-fit these grooves to each other becomes cumbersome and the cost of manufacture increases.

As a structure which can eliminate such inconveniences, a shock absorbing type steering shaft as shown in FIGS. 10 to 16 of the accompanying drawings is described in Japanese Utility Model Application Laid-Open No. 6-8150. This shock absorbing type steering shaft 11 is constructed such that an outer shaft 12 and an inner shaft 13 are combined for relative displacement in an axial direction (the left to right direction as viewed in FIG. 10), whereby the full length shortens when an impact force in the axial direction is applied.

The outer shaft 12 as a whole is of a tubular shape and one end portion (the left end portion as viewed in FIGS. 10 and 14) thereof is subjected to drawing, whereby a small-diametered portion 14 is formed in this end portion. A female serration 15 is formed on the inner peripheral surface of this small-diametered portion 14. The inner shaft 13 as a whole is of a tubular shape and one end portion (the right end portion as viewed in FIGS. 10 and 11) thereof is widened to thereby form a large-diametered portion 16. A male serration 17 is formed on the outer peripheral surface of the large-diametered portion 16 and engaged with the female serration 15.

Also, the fore end portion (the right end portion as viewed in FIGS. 10 and 11) of the large-diametered portion 16 is squeezed a little in the diametral direction thereof, whereby a first deformed portion 18 of an elliptical cross-sectional shape is formed over a length L. The major axis $d_1$ of this first deformed portion 18 is larger than the diameter $d_0$ of the body portion of the large-diametered portion 16, and the minor axis $d_2$ of the first deformed portion 18 is smaller than the diameter $d_0$ ($d_1 > d_0 \geq d_2$). The diameters of the large-diametered portion 16 on which the male serration 17 is formed are all represented by the diameter (pcd) of that portion of the serration which corresponds to a pitch circle.

The fore end portion (the left end portion as viewed in FIGS. 10 and 14) of the small-diametered portion 14 is also squeezed a little in the diametral direction thereof, whereby a second deformed portion 19 of an elliptical cross-sectional shape is formed over a length L. The major axis $D_1$ of this second deformed portion 19 is larger than the diameter $D_0$ of the body portion of the small-diametered portion 14, and the minor axis $D_2$ of the second deformed portion 19 is smaller than the diameter $D_0$ ($D_1 \geq D_0 > D_2$). The diameters of the small-diametered portion 14 on which the female serration 15 is formed are all represented by the diameter (pcd) of that portion of the serration which corresponds to a pitch circle.

Also, the diameter $D_0$ of the small-diametered portion 14 is made slightly larger than the diameter $d_0$ of the large-diametered portion 16 ($D_0 > d_0$) so that the female serration 15 and the male serration 17 may be loosely engaged with each other in portions other than the first and second deformed portions 18 and 19. However, the major axis $d_1$ of the first deformed portion 18 is a little larger than the diameter $D_0$ of the body portion of the small-diametered portion 14 ($d_1 > D_0$) and the minor axis $D_2$ of the second deformed portion 19 is a little smaller than the diameter $d_0$ of the body portion of the large-diametered portion 16 ($D_2 < d_0$).

The outer shaft 12 and inner shaft 13 of the shapes as described above are combined together as shown in FIG. 10 to thereby provide the shock absorbing type steering shaft 11. That is, the large-diametered portion 16 formed on one end portion of the inner shaft 13 is located inside the small-diametered portion 14 formed on one end portion of the outer shaft 12, and the female serration 15 on the inner peripheral surface of the small-diametered portion 14 and the male serration 17 on the outer peripheral surface of the large-diametered portion 16 are brought into engagement with each other. In this state, the first deformed portion 18 formed on the fore end portion of the large-diametered portion 16 is pushed into the base end portion (the right end portion as viewed in FIGS. 10 and 14) of the small-diametered portion 14 while being elastically deformed (or plastically deformed). The second deformed portion 19 formed on the fore end portion of the small-diametered portion 14 is pushed into the base end portion (the left end portion as viewed in FIGS. 10 and 11) of the large-diametered portion 16 while being also elastically deformed (or plastically deformed).

Accordingly, in the state in which the outer shaft 12 and the inner shaft 13 are combined together as shown in FIG. 10, the outer peripheral surface of the first deformed portion 18 is frictionally engaged with the inner peripheral surface of the base end portion of the small-diametered portion 14 and the inner peripheral surface of the second deformed portion 19 is frictionally engaged with the outer peripheral surface of the base end portion of the large-diametered portion 16. As a result, the outer shaft 12 and the inner shaft 13 are coupled together for the transmission of a rotational force between the two shafts 12 and 13 but against relative displacement in the axial direction as long as a strong force is not applied.

The coupling of the outer shaft 12 and the inner shaft 13 is thus effected by the pressure fitting of the first and second deformed portions 18 and 19 formed on the metallic outer shaft 12 and inner shaft 13 to the partner members and therefore, the heat resisting property of the coupling portion becomes sufficient and it never happens that the supporting force of the coupling portion becomes deficient depending on use conditions. Also, the first and second deformed portions 18 and 19 are provided at two axially spaced apart locations in the coupling portion between the outer shaft 12 and the inner shaft 13 and therefore, the bending rigidity of the coupling portion between the outer shaft 12 and the inner shaft 13 is also sufficiently secured.

Further, when a strong force is applied in the axial direction during collision, the outer shaft 12 and the inner shaft 13 are displaced relative to each other in the axial direction against a frictional force exerted on the pressure-fitted portions by the first and second deformed portions 18 and 19 to thereby shorten the full length of the shock absorbing type steering shaft 11. In the case of such a shock absorbing type steering shaft 11, the force required to shorten the full length suffices if it overcomes the frictional force exerted on the above-described two pressure-fitted portions. Accordingly, a collapse load required to shorten the full length of the shock absorbing type steering shaft 11 is stable without becoming great, thereby effectively preventing a great impact force from being applied to a driver's body which has collided against the steering wheel in case of a collision accident.

The collapse load can be arbitrarily adjusted by changing the length L and/or the major axis $d_1$ and the minor axis $D_2$ of the first and second deformed portions 18 and 19. Also, the two pressure-fitted portions are provided on the opposite end portions of the portion of engagement between the small-diametered portion 14 formed on one end portion of the outer shaft 12 and the large-diametered portion 16 formed on one end portion of the inner shaft 13 and therefore, the magnitude of the force required to shorten the full length of the shock absorbing type steering shaft 11 becomes small from a predetermined point (after the amount of contraction of the shock absorbing type steering shaft 11 exceeds the length L and the first deformed portion 18 comes off the small-diametered portion 14 and the second deformed portion 19 comes off the large-diametered portion 16) as shown in FIG. 17 of the accompanying drawings. The stroke amount (the amount of contraction) required until the force thus becomes small can be arbitrarily set by changing the length L of the first and second deformed portions 18 and 19.

To form the second deformed portion 19 on one end portion of the outer shaft 12 constituting such a shock absorbing type steering shaft 11, the outer shaft 12 and the inner shaft 13 are combined together into a state as shown in FIG. 18 of the accompanying drawings wherein the fore end portion (the left end portion as viewed in FIG. 18) of the small-diametered portion 14 is protruded a little from the base end portion (the left end portion as viewed in FIG. 18) of the large-diametered portion 16, and in this state, the fore end portion of the small-diametered portion 14 is squeezed in the diametral direction thereof to thereby form the second deformed portion 19. Also, to form the first deformed portion 18 on one end portion of the inner shaft 13, a mold 26 having an elliptical cross-section as shown in FIG. 19 of the accompanying drawings is pushed into the fore end portion of the large-diametered portion 16 formed on one end of the inner shaft 13 to thereby plastically deform this fore end portion.

The shock absorbing type steering shaft 11 constructed and acting as described above can have a sufficient heat resisting property and rigidity and yet can collapse under a sufficiently low load and can thus effectively improve the safety of the driver during a collision accident, but it is desired to simplify the manufacturing work to thereby reduce the manufacturing cost. Heretofore, the work of forming the second deformed portion 19 on the outer shaft 12 and the work of forming the first deformed portion 18 on the inner shaft 13 have been done discretely. Therefore, the following two problems (1) and (2) have arisen.

(1) Since these deformed portions 19 and 18 are formed discretely, two steps become necessary to form the deformed portions 19 and 18.

(2) Also, since the deformed portions 19 and 18 are formed discretely, the adjustment of the fitting strength of the outer shaft 12 and the inner shaft 13 by these deformed portions 19 and 18 becomes cumbersome.

Due to these causes (1) and (2), the manufacturing cost of the shock absorbing type steering shaft 11 increases. The shock absorbing type steering shaft of the present invention has been made in order to reduce the manufacturing cost in view of such circumstances.

SUMMARY OF THE INVENTION

A method of manufacturing a shock absorbing type steering shaft according to the present invention comprises pressing the outer peripheral surface of the small-diametered portion of a tubular outer shaft having a small-diametered portion reduced at least in its inner diameter on one end portion thereof and having a female serration formed on the inner peripheral surface of said small-diametered portion, inwardly in the diametral direction thereof, with the fore end portion of said small-diametered portion engaged with the fore end portion of the large-diametered portion of an inner shaft having a large-diametered portion enlarged at least in its outer diameter on one end portion thereof and having a male serration formed on the outer peripheral surface of said large-diametered portion and engaged with said female serration, thereby plastically deforming the fore end portion of said small-diametered portion and the fore end portion of said large-diametered portion inwardly in the diametral direction thereof, thereafter displacing said outer shaft and said inner shaft relative to each other toward each other in the axial direction thereof, thereby pressure-fitting the fore end portion of said small-diametered portion into the base end portion of said large-diametered portion and pressure-fitting the fore end portion of said large-diametered portion into the base end portion of said small-diametered portion, and bringing the intermediate portion of said small-diametered portion and the intermediate portion of said large-diametered portion into loose engagement with each other. To facilitate said plastic deformation, at least the fore end portion of said large-diametered portion is preferably made tubular.

In the method of making a shock absorbing type steering shaft according to the present invention constructed as described above, the fore end portion of the small-diametered portion and the fore end portion of the large-diametered portion are plastically deformed simultaneously and therefore, only one step is required for the plastic deformation. Also, because the outer shaft and the inner shaft are plastically deformed together, the adjustment of the amount of deformation is easy and the adjustment of the fitting strength of the outer and inner shafts becomes easy. As a result, a reduction in the manufacturing cost of the shock absorbing type steering shaft can be achieved.

DESCRIPTION OF THE PREFERRED EMBODIMENTS

Figure 1:
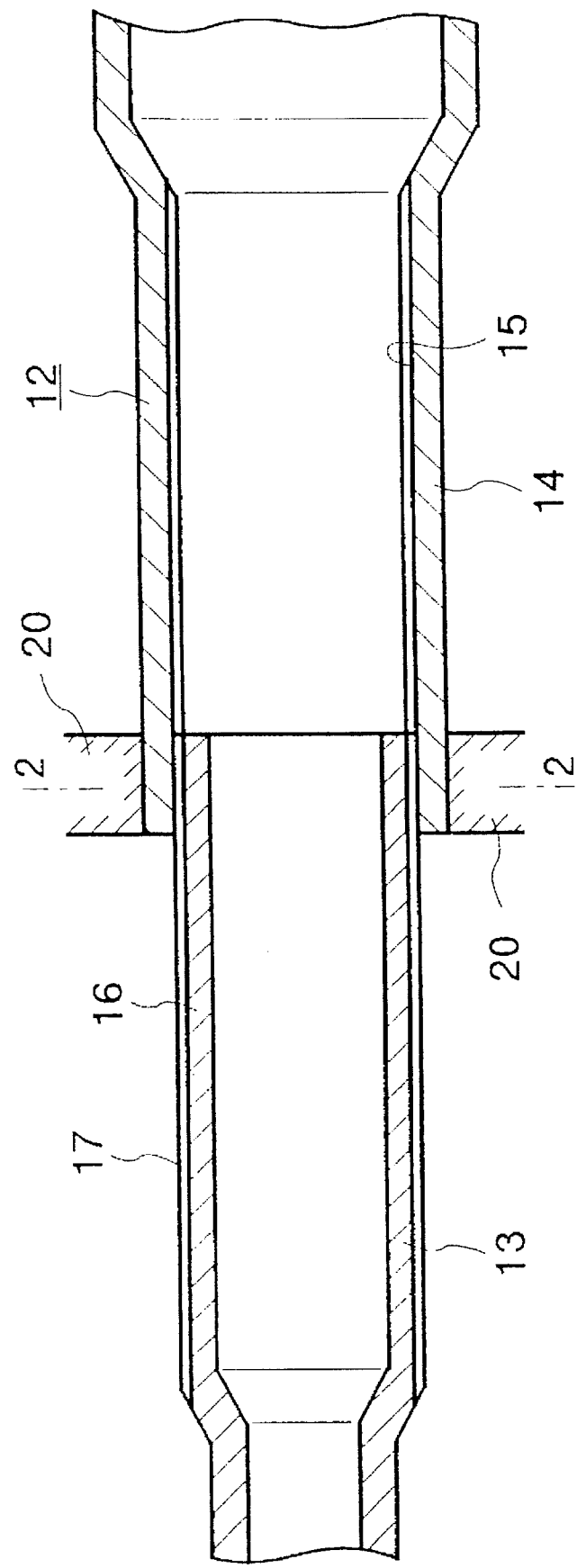
FIG. 1 is a cross-sectional view showing principalal portions of a first embodiment of the present invention.
Figure 2:
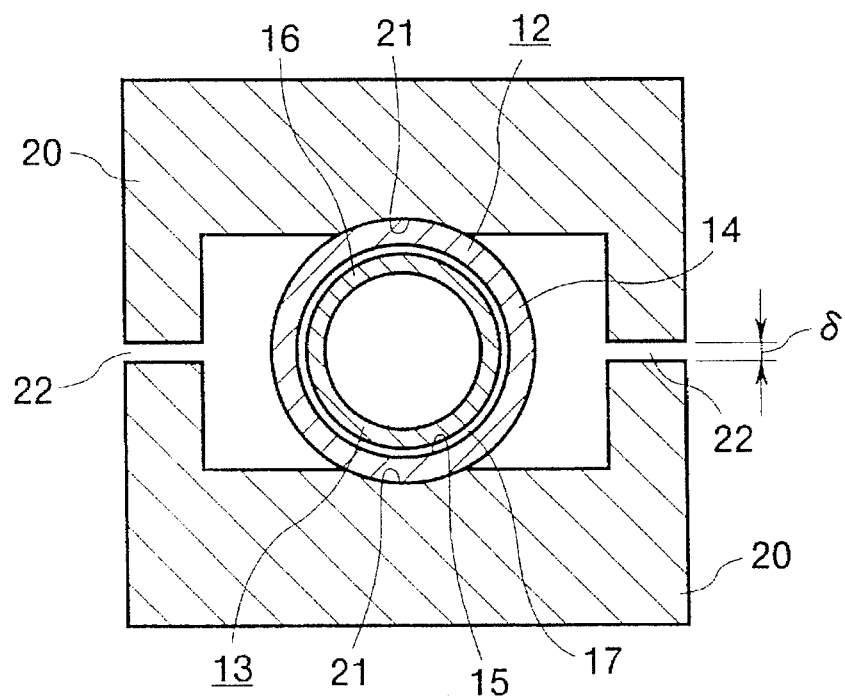
FIG. 2 is a cross-sectional view taken on the line 2—2 of FIG. 1 and showing a state before plastic deformation.
Figure 3:
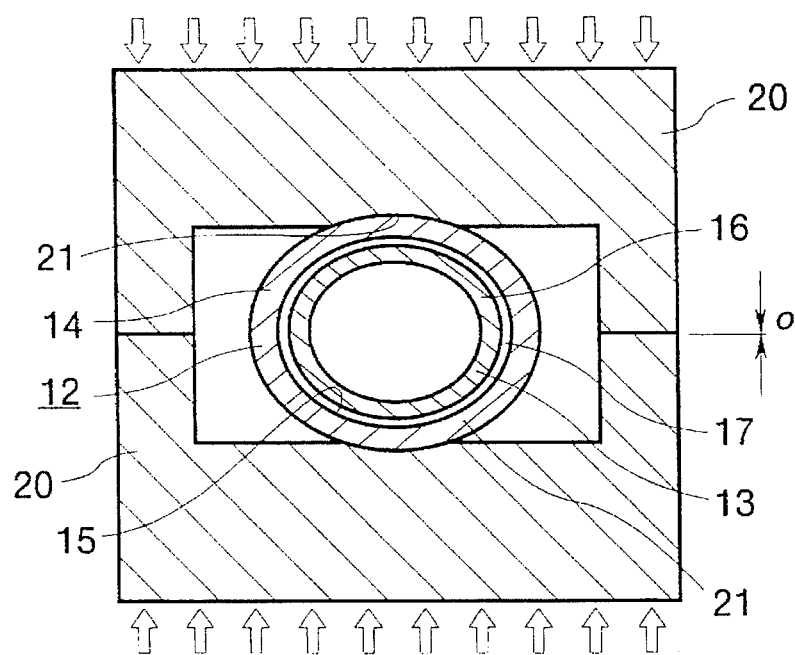
FIG. 3 is a view similar to FIG. 2 but showing a state after plastic deformation.

FIGS. 1 to 3 show a first embodiment of the present invention. The structure and function of a shock absorbing type steering shaft made by the manufacturing method of the present invention are the same as those of the prior-art shock absorbing type steering shaft previously described with reference to FIGS. 10 to 16. Consequently, the description of the structure and function is omitted herein and the manufacturing method of the present invention will be described hereinafter.

A small-diametered portion 14 reduced at least in its inner diameter is provided on one end portion of a tubular outer shaft 12. A female serration 15 is formed on the inner peripheral surface of the small-diametered portion 14. A large-diametered portion 16 enlarged at least in its outer diameter is provided on one end portion of a tubular inner shaft 13. A male serration 17 engaged with the female serration 15 is formed on the outer peripheral surface of the large-diametered portion 16.

Figure 10:
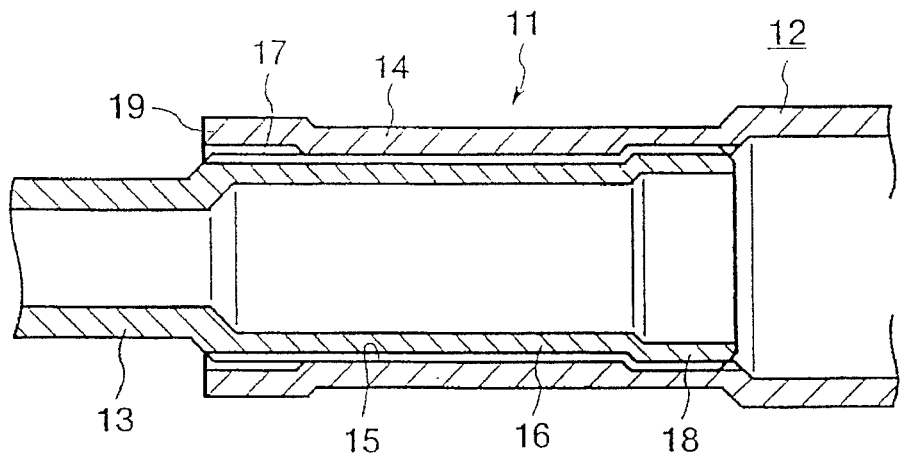
FIG. 10 is a cross-sectional view showing principal portions of an example of the structure according to the prior art.
Figure 11:
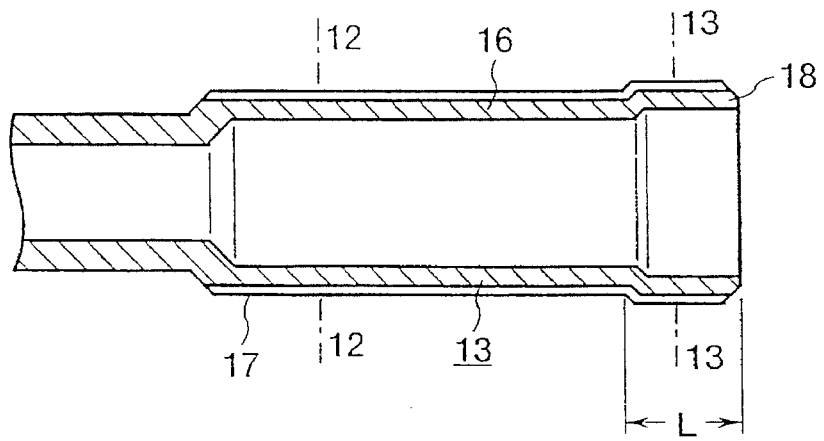
FIG. 11 is a cross-sectional view of an inner shaft incorporated in the structure according to the prior art.
Figure 12:
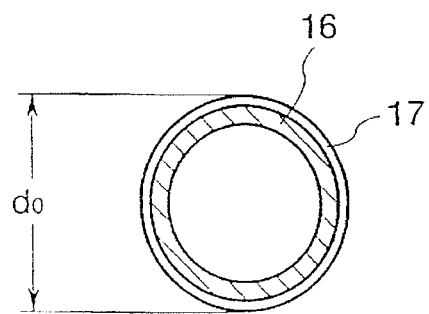
FIG. 12 is a cross-sectional view taken along the line 12—12 of FIG. 11.
Figure 13:
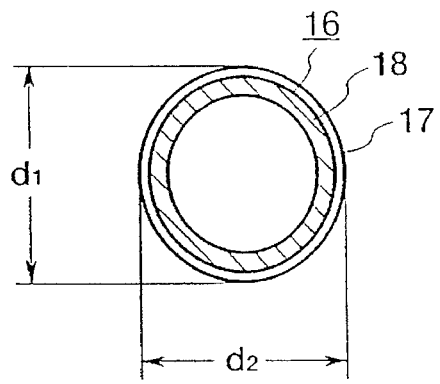
FIG. 13 is a cross-sectional view taken along the line 13—13 of FIG. 11.
Figure 14:
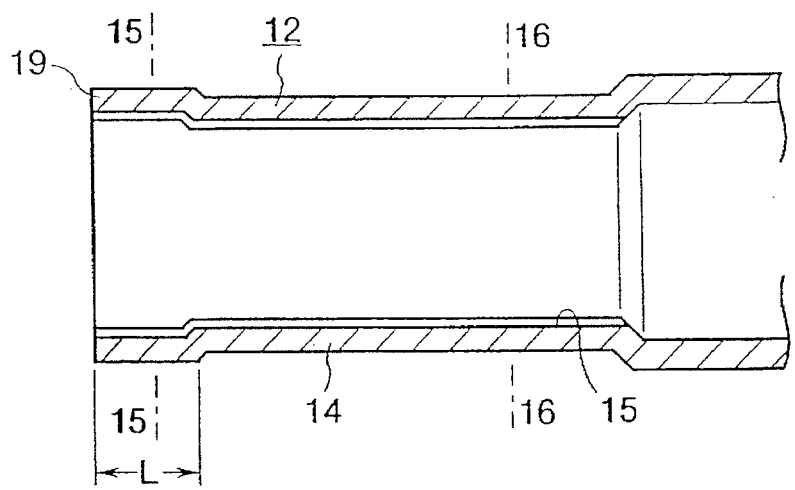
FIG. 14 is a cross-sectional view of an outer shaft incorporated in the structure according to the prior art.
Figure 15:
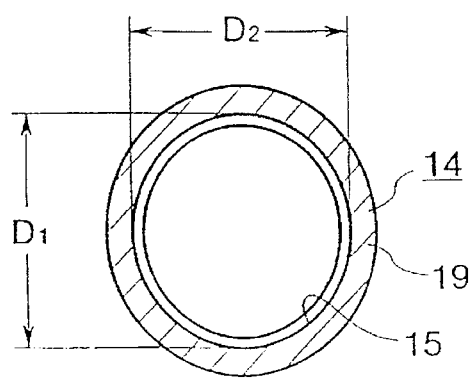
FIG. 15 is a cross-sectional view taken along the line 15—15 of FIG. 14.
Figure 16:
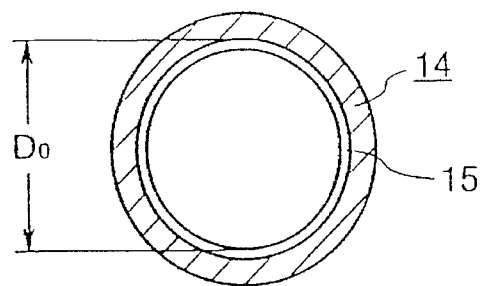
FIG. 16 is a cross-sectional view taken along the line 16—16 of FIG. 14.
Figure 17:
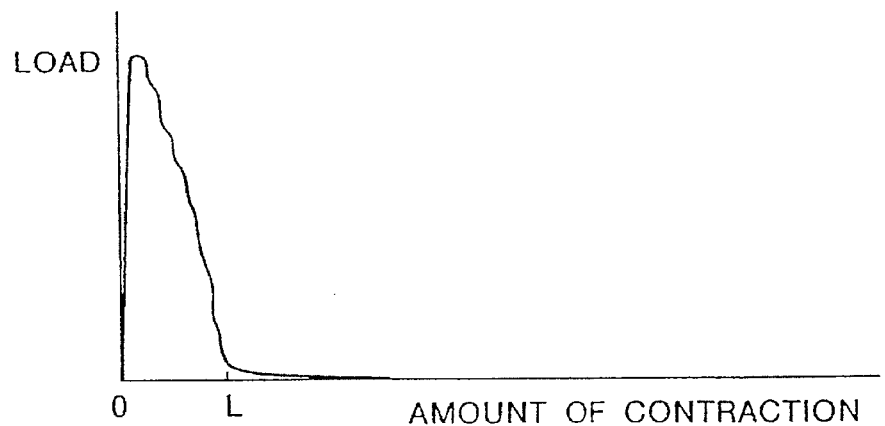
FIG. 17 is a graph showing the relation between the amount of contraction of a steering shaft and a load.
Figure 18:
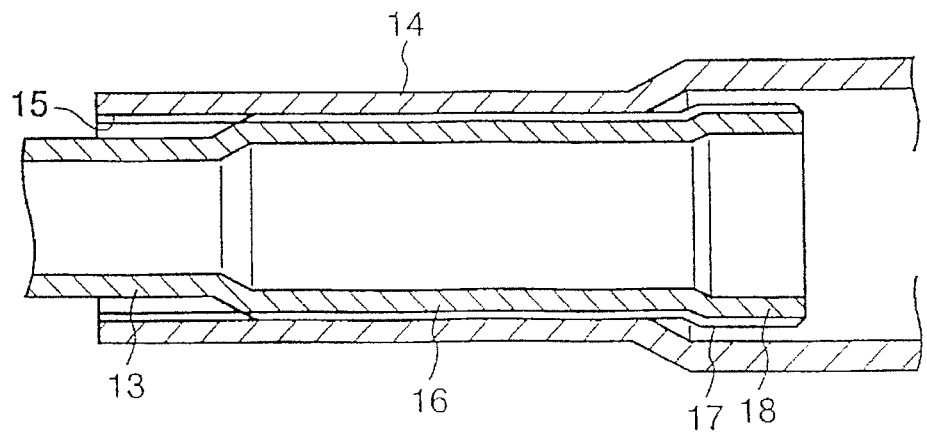
FIG. 18 is a cross-sectional view showing an example of a state in which a second deformed portion is formed.
Figure 19:
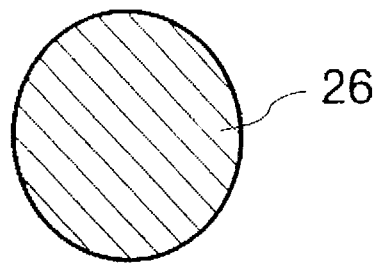
FIG. 19 is a cross-sectional view showing an example of a mold for forming a first deformed portion.

When such outer shaft 12 and inner shaft 13 are to be combined together to thereby construct the shock absorbing type steering shaft 11 as shown in FIG. 10, the two shafts 12 and 13 are first combined together as shown in FIG. 1. That is, the female serration 15 and the male serration 17 are brought into engagement with each other by the fore end portion of the small-diametered portion 14 and the fore end portion of the large-diametered portion 16.

With these setrations 15 and 17 kept in engagement with each other, the outer peripheral surface of the small-diametered portion 14 is pressed inwardly in the diametral direction thereof. That is, a pair of pressing pieces 20 and 20 are disposed around the fore end portion of the small-diametered portion 14 and the fore end portion of the large-diametered portion 16, and the pair of pressing pieces 20 and 20 are brought close to each other to thereby press the outer peripheral surface of the small-diametered portion 14 strongly. The inner side surfaces of these pressing pieces 20 and 20 which bear against the outer peripheral surface of the small-diametered portion 14 are formed with recesses 21 and 21 of an arcuate cross-sectional shape which are in intimate contact with this outer peripheral surface.

Gaps 22 and 22 having a thickness dimension δ are formed between the end surfaces of the pair of pressing pieces 20 and 20 with the recesses 21 and 21 brought into light contact with the outer peripheral surface of the small-diametered portion 14. Also, these pressing pieces 20 and 20 are strongly pressed toward each other by a pressing device, not shown, such as a hydraulic mechanism. So, if as shown in FIG. 3, the pair of pressing pieces 20 and 20 are moved toward each other until the thickness dimension of the gaps 22 and 22 becomes zero, the cross-sectional shape of the fore end portion of the small-diametered portion 14 will be plastically deformed into an elliptical shape as shown in FIG. 3. Further, the fore end portion of the large-diametered portion 16 inserted in the fore end portion of the small-diametered portion 14 is also pushed in the same direction through the two serrations 15 and 17. The cross-sectional shape of the fore end portion of the large-diametered portion 16 is also plastically deformed into an elliptical shape as shown in FIG. 3.

In this manner, the fore end portion of the small-diametered portion 14 and the fore end portion of the large-diametered portion 16 are pressed inwardly in the diametral direction thereof and the cross-sectional shapes of these two fore end portions are plastically deformed into an elliptical shape, whereafter the outer shaft 12 and the inner shaft 13 are displaced relative to each other toward each other in the axial direction. That is, after the two shafts 12 and 13 have been taken out of the pair of pressing pieces 20 and 20, the outer shaft 12 is displaced leftwardly as viewed in FIG. 1 relative to the inner shaft 13, and the inner shaft is displaced rightwardly as viewed in FIG. 1 relative to the outer shaft 12, whereby the shafts reach a state as shown in FIG. 10. As a result the fore end portion of the small-diametered portion 14 is pressure-fitted into the base end portion of the large-diametered portion 16, the fore end portion of the large-diametered portion 16 is pressure-fitted into the base end portion of the small-diametered portion 14, and the intermediate portion of the small-diametered portion 14, and the intermediate portion of the large-diametered portion 16 which are not plastically deformed by the pressing pieces 20 and 20 are brought into loose engagement with each other.

In the method of manufacturing the shock absorbing type steering shaft of the present invention constructed as described above, the fore end portion of the small-diametered portion 14 and the fore end portion of the large-diametered portion 16 are plastically deformed simultaneously and therefore, only one step is required for the plastic deformation. Also, because the outer shaft 12 and the inner shaft 13 are plastically deformed together, the adjustment of the amount of deformation is easy and the adjustment of the fitting strength of the outer shaft 12 and inner shaft 13 becomes easy. In the case of the present embodiment, due to the formation of the recesses 21 and 21 in the inner side surfaces of the pressing pieces 20 and 20, the circumferential length of the portion at which the female serration 15 and the male serration 17 bear against each other becomes great. As a result, the bending rigidity and durability of the obtained shock absorbing type steering shaft 11 (FIG. 10) can be achieved.

Figure 4:
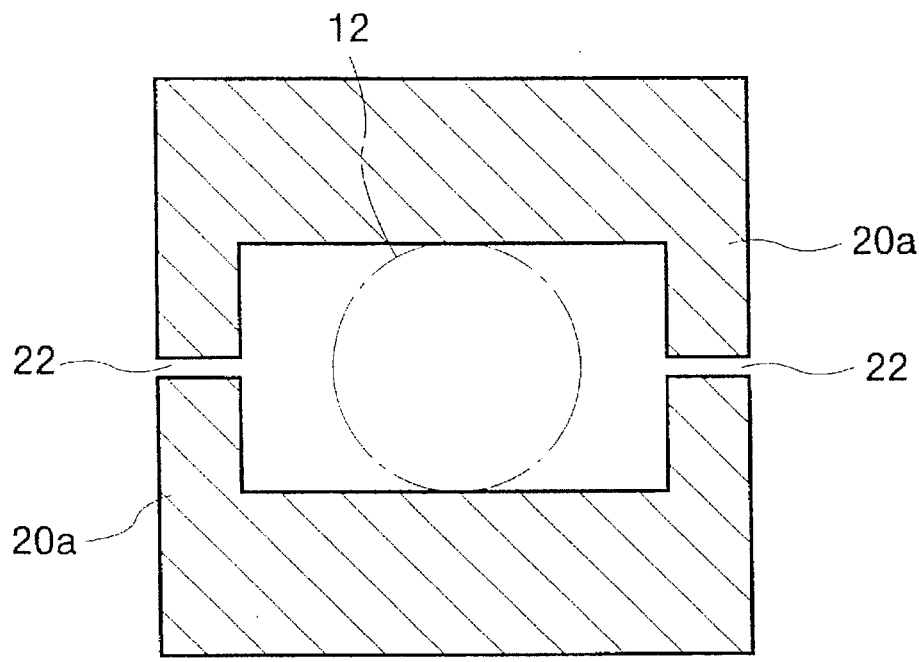
FIG. 4 is a view similar to FIG. 2 but showing a second embodiment of the present invention.

FIG. 4 shows a second embodiment of the present invention. In this embodiment, the inner side surfaces of pressing pieces 20a and 20a for plastically deforming the fore end portions (see FIG. 1) of the small-diametered portion 14 and the large-diametered portion 16 engaged with each other are not formed with the recesses 21 and 21 (FIGS. 2 and 3) but are made into simple flat surfaces. Accordingly, the circumferential length over which the female serration 15 and the male serration 17 bear strongly against each other by the fore end portions of the small-diametered portion 14 and the large-diametered portion 16 which are squeezed by the pressing pieces 20a and 20a becomes relatively small. As a result, the degree to which a collapse load necessary to shorten the full length of the obtained shock absorbing type steering shaft 11 (FIG. 10) is affected by the fitting strength (interference) of the serrations 15 and 17 becomes low, and this collapse load becomes stable. In the other points, the construction and function of the present embodiment are similar to those of the above-described first embodiment.

Figure 5:
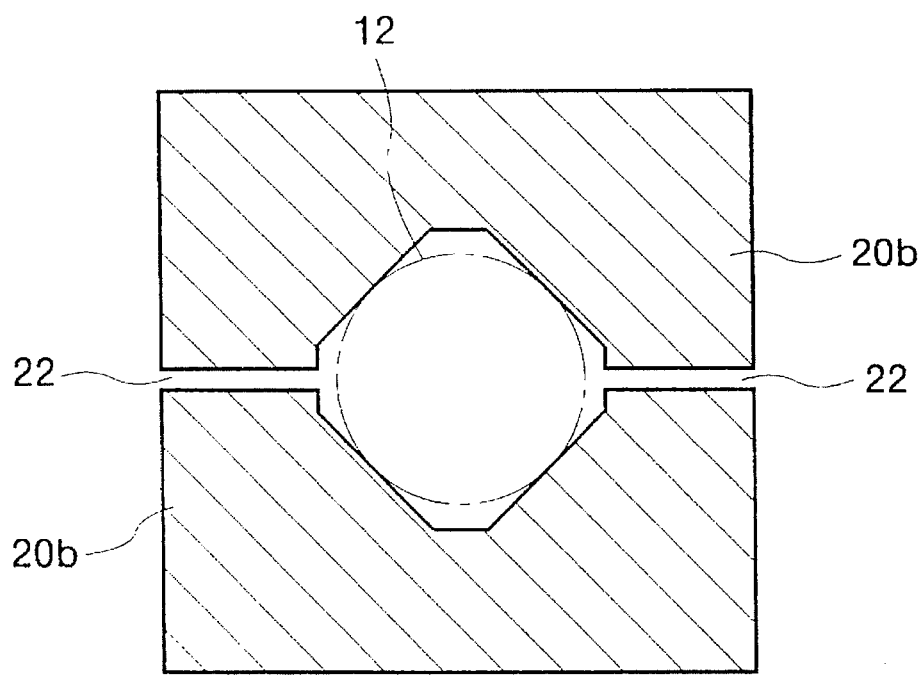
FIG. 5 is a view similar to FIG. 2 but showing a third embodiment of the present invention.

FIG. 5 shows a third embodiment of the present invention. In this embodiment, a pair of pressing pieces 20b and 20b are formed into a V block shape so as to press the fore end portions (see FIG. 1) of the small-diametered portion 14 and the large-diametered portion 16 engaged with each other at two locations each, i.e., four locations in total. In the present embodiment, there are four portions in the circumferential direction at which the female serration 15 and the male serration 17 bear strongly against each other. As a result, the bending rigidity and durability of the obtained shock absorbing type steering shaft 11 (FIG. 10) can be achieved. In the other points, the construction and function of the present embodiment are similar to those of the above-described first embodiment. Although not shown, if one of the pair of pressing pieces is made into a flat surface and the other is formed into a V block shape, there will be three portions on the circumference in which the female serration 15 and the male serration 17 bear strongly against each other, and stable bending rigidity will be obtained.

Figure 6:
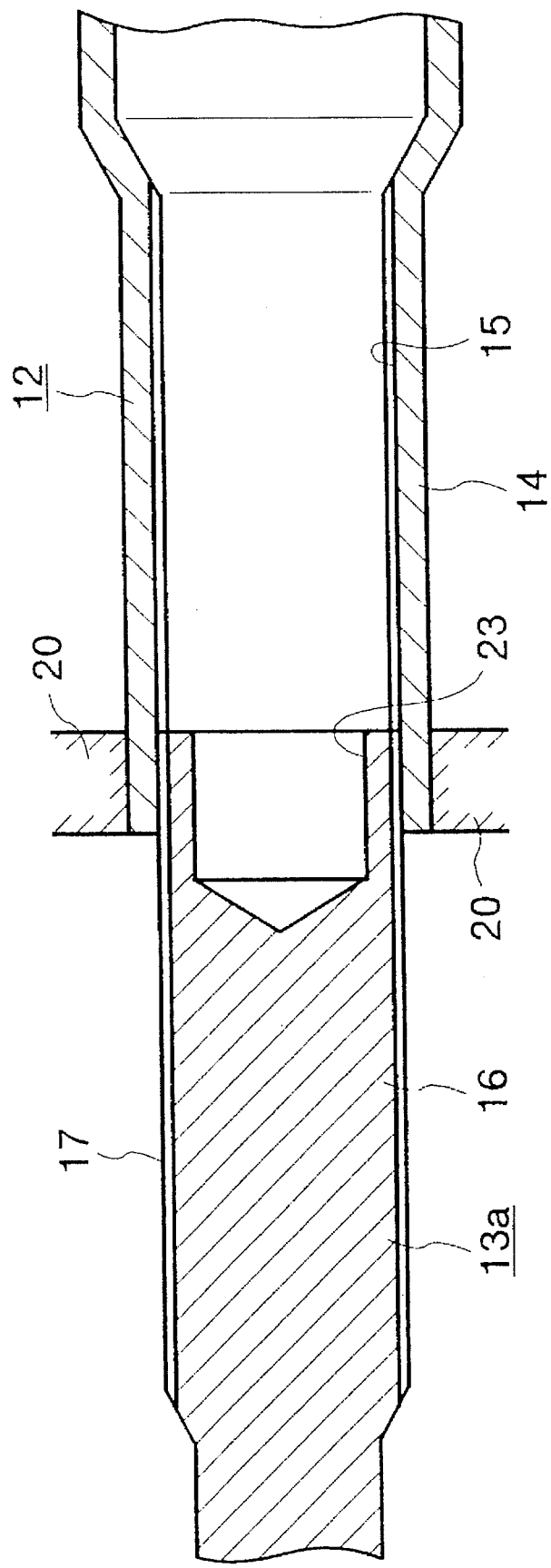
FIG. 6 is a cross-sectional view showing principal portions of a fourth embodiment of the present invention.

FIG. 6 shows a fourth embodiment of the present invention. In this embodiment, a circular rod-like solid member is used as an inner shaft 13a and a circular hole 23 is formed in the fore end surface of this inner shaft 13a, whereby this fore end portion is formed into a tubular shape and the cross-sectional shape of this fore end portion is made plastically deformable. In the other points, the construction and function of the present embodiment are similar to those of the above-described first embodiment.

Figure 7:
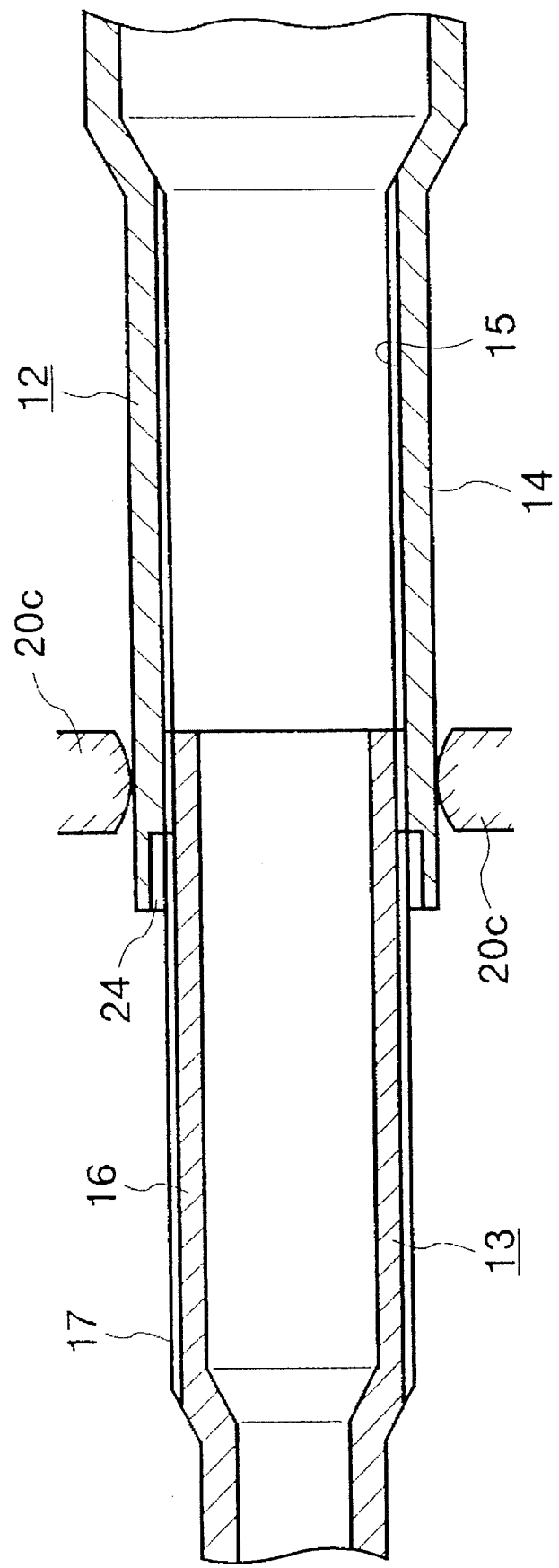
FIG. 7 is a cross-sectional view showing principal portions of a fifth embodiment of the present invention.

FIG. 7 shows a fifth embodiment of the present invention. In this embodiment, the cross-section of a pair of pressing pieces 20c and 20c in the axial direction thereof (the left to right direction as viewed in FIG. 7) is of an arcuate convex surface shape. Accordingly, when the fore end portions of the small-diametered portion 14 and the large-diametered portion 16, which are engaged with each other, are plastically deformed by these pressing pieces 20c and 20c, the cross-sectional shape of these plastically deformed portions in the axial direction thereof becomes an arcuate shape in which the axially intermediate portion swells inwardly in the diametral direction. As a result, when the outer shaft 12 and the inner shaft 13 are brought close to each other after the fore end portions have been plastically deformed, it never happens that the axial end edges of the plastically deformed portions score the male serration 17 or the female serration 15. Accordingly, a load required to bring the outer shaft 12 and the inner shaft 13 close to each other may be small. Further, the collapse load during a collision accident is small and stable.

Figure 8:
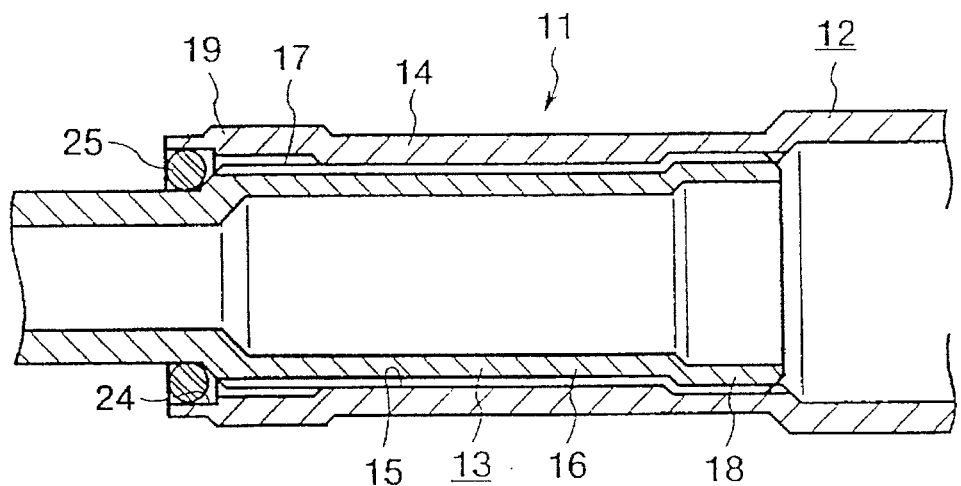
FIG. 8 is a cross-sectional view showing principal portions of a shock absorbing type steering shaft having an O-ring mounted thereon.
Figure 9:
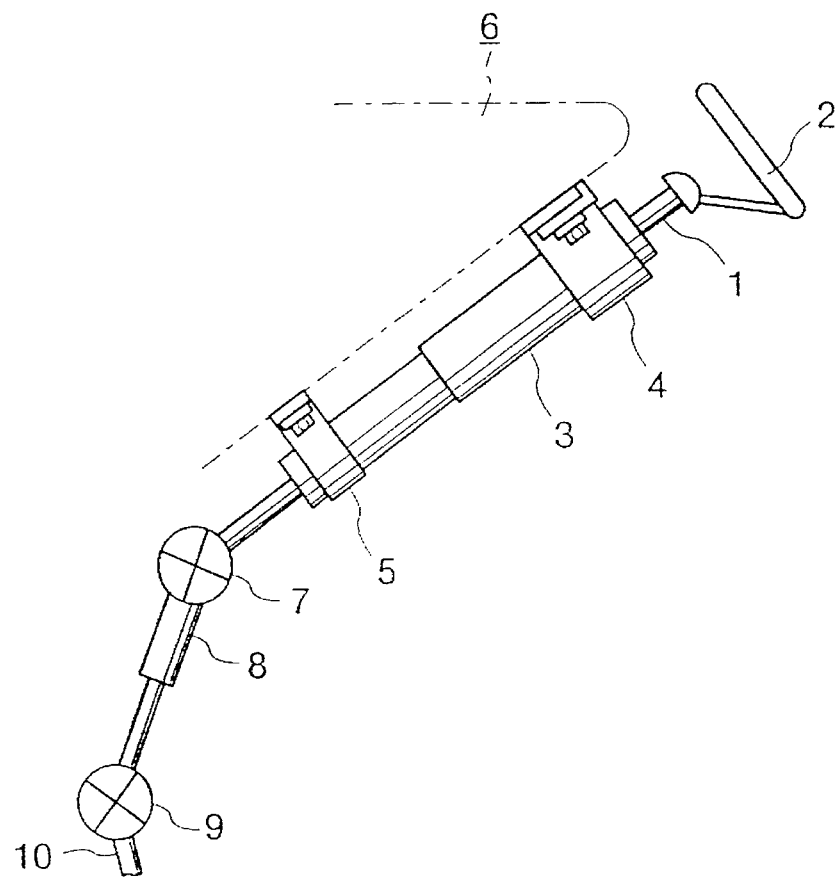
FIG. 9 is a side view showing an example of a steering mechanism that can incorporate a shock absorbing type steering shaft according to the present invention.

In the present embodiment, an engagement groove 24 is formed by cutting away the inner peripheral surface of the fore end portion of the outer shaft 12 over the entire circumference thereof. Inside this engagement groove 24, the outer shaft 12 and the inner shaft 13 are brought close to each other to thereby provide a shock absorbing type steering shaft 11 as shown in FIG. 8, whereafter an O-ring 25 is fitted thereto as shown in FIG. 8. This O-ring 25 prevents rainwater or the like from entering the portion of engagement between the male serration 17 and the female serration 15, and also prevents the portion of engagement between these serrations 15 and 17 from rusting. As a result, even when the shock absorbing type steering shaft 11 is provided outside a vehicle, the full length thereof can be reliably shortened during a collision accident. In the other points, the construction and function of the present embodiment are similar to those of the above-described first embodiment.

The method of manufacturing a shock absorbing type steering shaft according to the present invention is constructed and functions as described above and can therefore inexpensively manufacture a shock absorbing type steering shaft which can obtain a sufficient heat resisting property and rigidity and yet can stabilize the collapse load sufficiently low and can thus effectively achieve the securement of the safety of the driver during a collision accident.

What is claimed is:

1. A method of manufacturing a shock absorbing type steering shaft including a tubular outer shaft having a reduced-diameter portion with a reduced inner diameter and a female serration formed on an inner peripheral surface of said reduced-diameter portion, and an inner shaft having an enlarged-diameter portion with an enlarged outer diameter and a male serration formed on an outer peripheral surface of said enlarged-diameter portion and engaged with said female serration, each of said reduced-diameter portion and said enlarged-diameter portion having a fore end portion, a base end portion, and an intermediate portion between the fore end portion and the base end portion, said method comprising the following steps:

while said fore end portion of said enlarged-diameter portion is received in said fore end portion of said reduced-diameter portion, pressing the outer peripheral surface of said reduced-diameter portion inwardly in a diametral direction thereof to plastically deform said fore end portions of said reduced-diameter portion and said enlarged-diameter portion; and relatively displacing said outer shaft and said inner shaft axially toward each other to bring said fore end portion of said reduced-diameter portion and said fore end portion of said enlarged-diameter portion into pressure-fitting engagement with said base end portion of said enlarged-diameter portion and said base end portion of said reduced-diameter portion, respectively, and to bring said intermediate portions of said reduced-diameter portion and said enlarged-diameter portion into loose engagement with each other.

2. The method of claim 1, wherein said inner shaft has a solid cross-section over a substantial portion of its length with the fore end portion of said enlarged diameter portion being tubular.

* * * * *